United States Patent [19]

Cook, Sr.

[11] Patent Number: 5,345,677
[45] Date of Patent: Sep. 13, 1994

[54] METHOD OF CONNECTING SECTIONS OF METAL CONDUITS

[75] Inventor: George W. Cook, Sr., South Daytona, Fla.

[73] Assignee: Bellemead Development Corporation, Daytona Beach Shores, Fla.

[21] Appl. No.: 990,074

[22] Filed: Dec. 14, 1992

[51] Int. Cl.⁵ .............................................. B23Q 3/00
[52] U.S. Cl. ................................ 29/897.3; 29/423; 29/464; 29/530
[58] Field of Search ................ 29/897, 897.1, 897.3, 29/897.33, 897.34, 423, 464, 527.1, 530

[56] References Cited

FOREIGN PATENT DOCUMENTS 470413 3/1992 Japan ................................ 29/897.33

*Primary Examiner*—Timothy V. Eley
*Attorney, Agent, or Firm*—James H. Beusse

[57] ABSTRACT

A method for connecting sections of metal conduits extending on opposite sides of a concrete floor in a multi-story building in which the floor is formed by pouring concrete over a form. The method comprises positioning a first section of metal conduit on the form with a first open end against the form and a second open end extending above a height of the concrete to be poured over the form. A removable ring is fitted about the first open end of the first conduit section abutting the form to create an open space circumscribing the first end after pouring of the concrete. A relatively rigid cover is positioned over the second end of the conduit section. A fastener is inserted through the cover and into the form and tightened to compress and hold the conduit section in a fixed position on the form. Concrete is poured onto the form and allowed to harden about the first conduit section. Afterward, the fastener and form are removed to expose the ends of the conduit section. The ring is removed from about the first end of the conduit section to expose the end such that other sections of metal conduit can be connected through the embedded conduit section.

3 Claims, 2 Drawing Sheets

METHOD OF CONNECTING SECTIONS OF METAL CONDUITS

The present invention relates to a method for coupling piping or conduits through concrete floors of buildings and, more particularly, to a method for providing an improved fireproof coupling through a concrete floor.

BACKGROUND OF THE INVENTION

Building codes for multi-story buildings require that piping or conduits through concrete floors be arranged in such a manner as to avoid fire and smoke migrating between floors through conduit passages. Various methods have been used to meet the code requirements. For example, one method is to pass a conduit through an oversized opening in the concrete floor and then to pack some form of fireproof compound about the conduit in the opening. Methods of this type have been approved by Underwriters Laboratories using materials such as 3M Fire Barrier CP 25 caulk from 3M Corporation or FS sealant from Dow Corning Corporation. The conduits are typically cast iron or steel pipe so that only the space surrounding the pipe need be insulated.

Another form of fireproof passage utilizes a plastic connector (PVC or similar material) which is attached to a form on which a floor is to be poured. FIG. 1 illustrates this type of prior art device which comprises a pipe segment 10 having a mounting flange 12. The flange 12 is nailed to the form 14 which supports the concrete during pouring of the floor 16. The segment 10 is then stuffed with newsprint or similar material to prevent concrete from entering during pouring. After the concrete has set, the form is removed along with the newsprint and coupling adapters 17 are adhesively bonded to each end of segment 10. The adapters 17 are flexible so that clamps 18 can be placed around their larger end for clamping the adapters in sealing engagement about the cast iron pipe 20.

There are several known disadvantages of the plastic connector, including excessive cost. Further, the adapters 17 are flexible and must set in position several hours to allow the adhesive to bond them to the connector. Still further, the plastic connectors are relatively fragile and have been known to tip over during concrete pouring either from the weight of the concrete or from an accidental collision with a worker or equipment. Accordingly, it is desirable to provide an improved connector which overcomes the above and other disadvantages of the prior art.

SUMMARY OF THE INVENTION

The present invention comprises a method for connecting sections of metal conduits extending on opposite sides of a concrete floor in a multi-story building wherein the floor is formed by pouring concrete over a form. A first step of the method requires positioning of a first section of metal conduit on the form with a first open end against the form and a second open end extending at least about one inch above a height of the concrete to be poured over the form to form the floor. Next, a removable ring is installed about the first open end of the first conduit section abutting the form to create an open space circumscribing the first end of the conduit after the concrete has been poured and the floor formed. A relatively rigid cover is placed over the second end of the conduit section. The cover has an aperture extending therethrough. A releasable fastener is inserted through the aperture in the cover and into the form. The fastener is tightened to compress and hold the conduit section in a fixed position on the form. The concrete is then poured onto the form and allowed to harden in situ about the first conduit section.

After the poured concrete has set, the fastener and form are removed to expose the first end of the conduit section. The ring is removed from about the first end of the conduit section to expose a selected extent of the first end in the open space created by the ring. Second and third sections of metal conduit are thereafter connected to respective first and second exposed ends of the first section of conduit. Preferably, the conduit sections are coupled by a flexible coupling member encircling each joint between the conduit sections.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
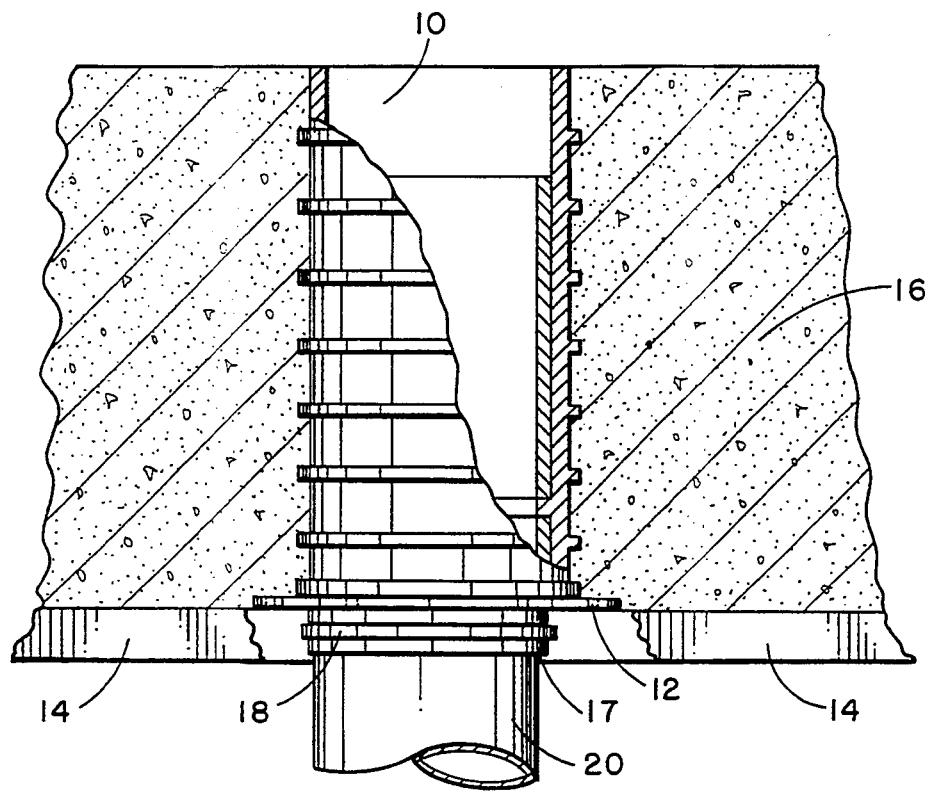
FIG. 1 is a partial cross-sectional view of a conduit coupling system of the prior art.
Figure 2:
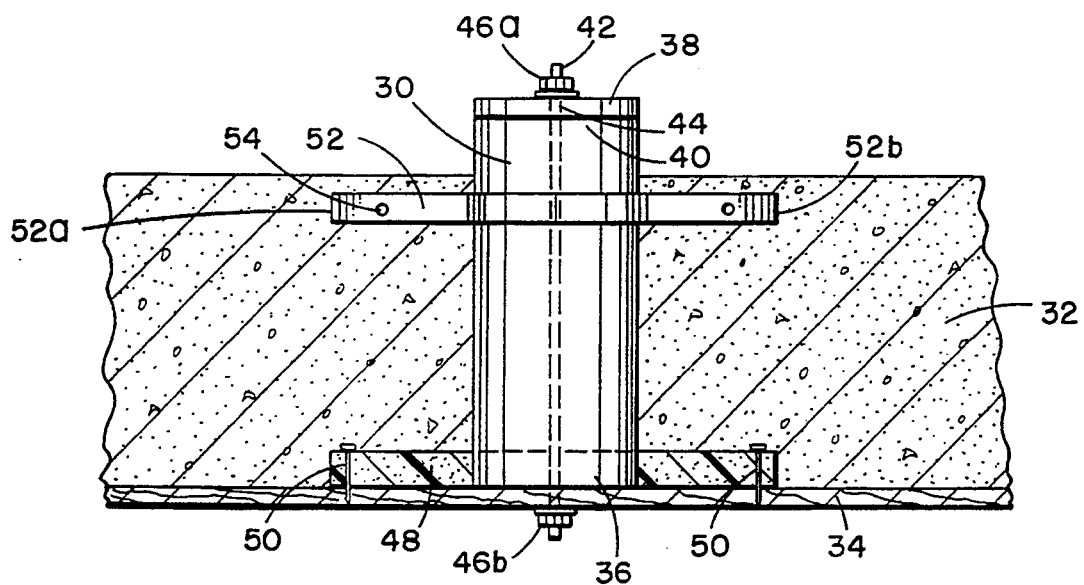
FIG. 2 is a cross-sectional view of a conduit coupling apparatus in accordance with the present invention.

FIG. 2 is a cross-sectional view of a concrete floor and fireproof conduit coupling in accordance with the present invention. The coupling comprises a first conduit section 30 which is preferably formed from the source conduit material used in conventional building conduits. In the case of three, four or six inch water or sewer lines, the conduit may comprise steel or cast iron piping. The section 30 is cut or formed to have a length which is at least one inch and preferably one and one-half inches longer than the thickness of the concrete barrier or floor 32 through which the conduit passes. In a multi-story building, concrete floors 32 are created by constructing a form 34 of plywood or other material on which to pour concrete. It is not desirable to cut holes in these forms for passing conduit sections since the forms are used numerous times and the holes appear at different locations. Further, such holes would weaken the form.

In the present invention, the conduit section 30 is positioned in a desired location and secured to the form 34 to prevent movement while concrete is being poured. One method of securing section 30 is to place a first open end 36 of section 30 against form 34, position a cap 38 of plywood or other material over a second open end 40, insert a fastener 42 through the cap 38 and form 34 and tighten the fastener to secure the section 30 to the forms. The cap 38 includes an aperture 44 extending therethrough for passage of fastener 42. The illustrative fastener 42 comprises a threaded rod extending through both the cap 38 and form 34 with nuts 46a, 46b on opposite ends. However, it will be recognized that a lag bolt of suitable length could be used and avoid the need to drill an aperture in form 34 and to eliminate nut 46b.

Figure 3:
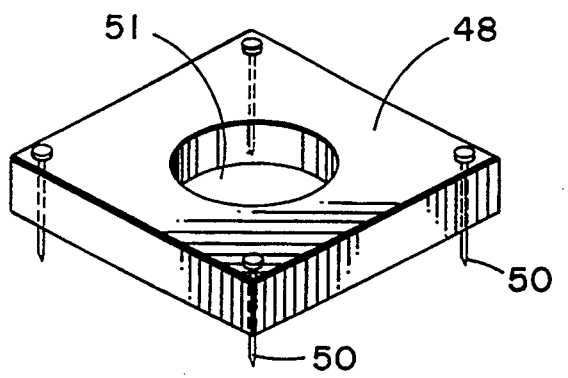
FIG. 3 is a perspective view of the ring shown in FIG. 2 for creating an access to a lower end of the conduit coupling section.

The end 36 of conduit section 30 is encircled by a ring 48 of removable material, such as, for example, a polystyrene, a styrofoam or other suitable material. Referring briefly to FIG. 3, the ring 48 may have a rectangular shape with a central aperture 51 fitting snugly about conduit section 30. The ring 48 is preferably about one inch thick and, for a conduit of about three inch O.D., measures about seven inches on each side. Although shown as rectangular, the ring 48 may also be formed as circular with a diameter corresponding to the width of the rectangular shape.

Referring again to FIG. 2, the ring 48 may be tacked to form 34 to assure that the ring remains in place during pouring of the concrete. Nails 50 are shown for this purpose.

A clamp 52 of black steel or other plated metal (to minimize corrosion) is also desirably fastened about conduit section 30. Clamp 52 may be a pair of metal straps drawn tightly together about section 30 by threaded fasteners indicated at 54. The clamp 52 is tightened sufficiently to avoid slippage on section 30 under normal load conditions. The clamp 52 has ends 52a, 52b which extend several inches from section 30, e.g., about three inches, and become embedded in the concrete poured around the conduit section. Although the concrete adheres to the section 30, the clamp 52 provides an extra margin of support to assure that the section 30 will satisfy building codes in terms of retentive strength in barrier 32.

Figure 4:
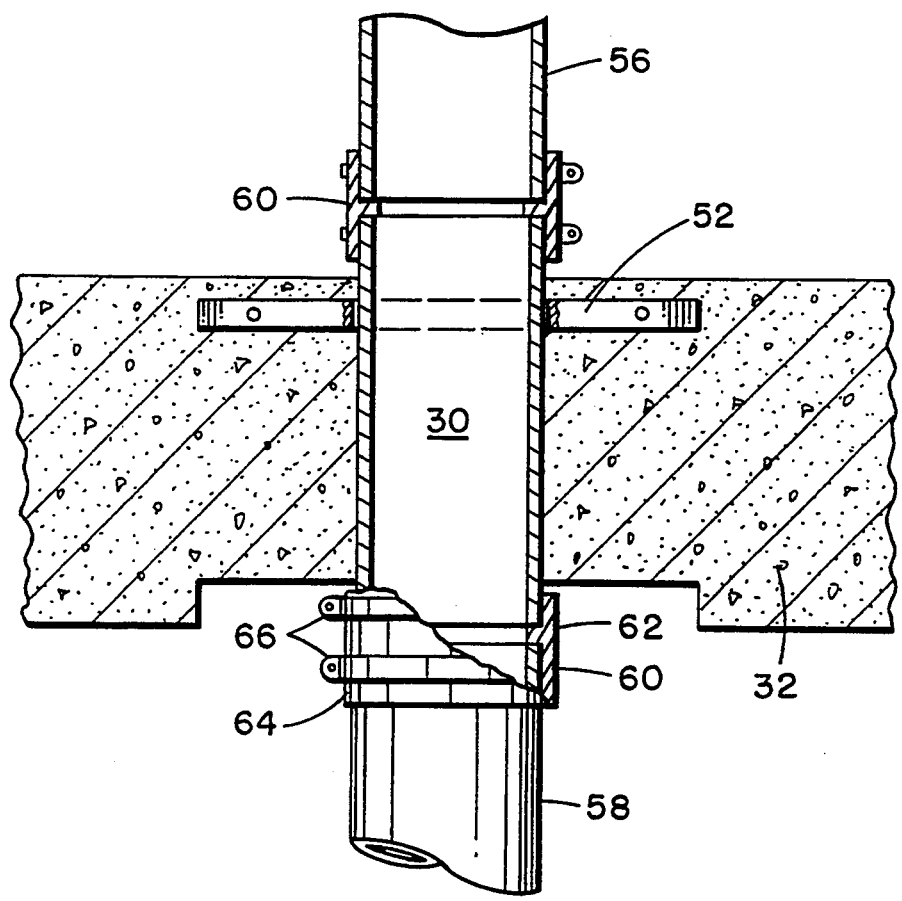
FIG. 4 is a cross-sectional view of coupling of conduit sections using the apparatus of FIG. 2.

When the concrete in barrier or floor 32 has set, the fastener 42 is removed along with cap 38. Thereafter, the form 34 is removed exposing the lower end 36 of conduit section 30. The ring 48, being tacked to form 34, may be removed with form 34 but if not, is removed by conventional means such as prying loose with a screwdriver or similar tool or, in the case of a material such as styrofoam, by breaking into small pieces and scraping away. The result is a floor having a metal conduit therethrough as shown in FIG. 4.

Conduit sections 56 and 58, having the same O.D. and I.D. as section 30, are attached to section 30 using conventional "no-hub" couplers 60. The couplers 60 are commercially available items and comprise a tubular inner flexible sealing material 62 (rubber or a rubber-like synthetic) and an outer stainless steel cover 64. A pair of clamps 66 tighten the coupler 60 about the conduit sections. As will be apparent, the purpose of the ring 48 is to create a recess or open space about the conduit end 36 to allow use of coupler 60 to connect section 30 to conduit section 56. Similarly, the second end 40 of section 30 protrudes above floor 32 to permit use of coupler 60 to connect section 30 to section 58. However, the protruding end 40 of section 30 is raised slightly higher above floor 32 for a secondary purpose of preventing water accumulating on floor 32 from draining through section 30 onto lower floors of a building. It is common in building construction to pour concrete floors in sequential steps from the ground upward. Construction materials are then stored on lower floors. Water accumulating on the upper floor from rain or other sources may flow through the conduit openings to the lower floors and damage stored materials. With the inventive conduit method, the embedded conduit sections extend above the floor at least an inch and preferably one and one-half inches so that water accumulating on the floor is generally prevented from flowing through conduit sections 30 to a lower floor.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claim is:

1. A method for connecting sections of metal conduits extending on opposite sides of a concrete floor in a multi-story building, the floor being formed by pouring concrete over a form, the method comprising the steps of:

positioning a first section of metal conduit on form with a first open end against the form and a second open end extending at least about one inch above a desired height of concrete to be poured over the form;

installing a removable ring about the first open end of the first conduit section abutting the form for creating an open space circumscribing said first end after pouring of the concrete;

positioning a relatively rigid cover over said second end of the conduit section, the cover having an aperture extending therethrough;

inserting a releasable fastener through the aperture in the cover and into the form;

tightening the fastener to compress and hold the conduit section in a fixed position on the form;

pouring the concrete onto the form and hardening the concrete in situ about the first conduit section;

removing the fastener and form to expose the first end of the conduit section;

removing the ring from about the first end of the first conduit section to expose a selected extent of the first end; and coupling second and third sections of metal conduit to respective first and second exposed ends of the first section of conduit.

2. The method of claim 1 wherein said step of coupling includes the further stp of positioning a flexible coupling member about each joint between the conduit sections.

3. The method of claim 1 and including the further step of, prior to the step of pouring the concrete, fastening a clamp about the first conduit section such that ends of the clamp extend outward from the conduit section for embedding in the concrete of the floor.

* * * * *